(12) United States Patent
Padaki et al.

(10) Patent No.: US 10,965,531 B2
(45) Date of Patent: Mar. 30, 2021

(54) SERVICE OFFERING WISH LIST ORDERING INTERFACE AND CONFLICT SCHEDULING CALENDAR SYSTEM

(71) Applicant: ServiceNow, Inc., Santa Clara, CA (US)

(72) Inventors: Bharath Padaki, San Diego, CA (US); Shouvik Goswami, Hyderabad (IN); Jason Occhialini, Loomis, CA (US); Nirupam Biswas, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 480 days.

(21) Appl. No.: 15/792,541

(22) Filed: Oct. 24, 2017

(65) Prior Publication Data

US 2019/0102817 A1    Apr. 4, 2019

Related U.S. Application Data

(60) Provisional application No. 62/568,087, filed on Oct. 4, 2017.

(51) Int. Cl.
*H04L 12/24*      (2006.01)
*G06F 9/50*       (2006.01)
(Continued)

(52) U.S. Cl.
CPC ........ *H04L 41/0859* (2013.01); *G06F 3/0481* (2013.01); *G06F 3/0482* (2013.01);
(Continued)

(58) Field of Classification Search
CPC ............... G06Q 40/12; G06Q 30/0603; G06Q 30/0641; G06Q 30/0635; G06Q 10/06314; H04L 41/0859; G06F 3/0486
(Continued)

(56) References Cited

U.S. PATENT DOCUMENTS 6,321,229 B1    11/2001  Goldman
6,609,122 B1    8/2003   Ensor
(Continued)

OTHER PUBLICATIONS

David Beard, Murugappan Palaniappan, Alan Humm, David Banks, Anil Nair, and Yen-Ping Shan, A visual calendar for scheduling group meetings, 1990, In Proceedings of the 1990 ACM conference on Computer-supported cooperative work, Association for Computing Machinery, New York, NY, USA, 279-290. (Year: 1990).*

(Continued)

*Primary Examiner* — Jason B Dunham
*Assistant Examiner* — Brittany E Bargeon
(74) *Attorney, Agent, or Firm* — Fletcher Yoder, P.C.

(57) ABSTRACT

Systems and methods for a service portal interface including a service offering catalog and conflict scheduling calendar are disclosed. A service offering catalog may make available tangible hardware and infrastructure equipment to employees of an organization via a web-based ordering system. The service offering catalog may also make available non-tangible services to be performed in support of one or more employees of the organization. The conflict calendar scheduling system may provide a graphical conflict detection and resolution interface incorporating calendar style view and drag and drop capability such than an end-user may adjust parameters of a scheduled update to align with other requested work items of an enterprise and result in a conflict free timeslot for maintenance and upgrade tasks.

20 Claims, 14 Drawing Sheets

(51) Int. Cl.

| | |
|---|---|
| G06F 9/48 | (2006.01) |
| G06F 9/46 | (2006.01) |
| H04L 29/08 | (2006.01) |
| H04L 29/06 | (2006.01) |
| G06F 11/14 | (2006.01) |
| G06F 40/18 | (2020.01) |
| G06F 40/186 | (2020.01) |
| G06F 16/951 | (2019.01) |
| G06F 9/54 | (2006.01) |
| G06F 9/451 | (2018.01) |
| G06F 16/27 | (2019.01) |
| G06F 16/2457 | (2019.01) |
| G06F 16/242 | (2019.01) |
| G06F 16/248 | (2019.01) |
| G06F 11/30 | (2006.01) |
| G06F 11/34 | (2006.01) |
| G06F 3/0486 | (2013.01) |
| G06Q 10/06 | (2012.01) |
| G06Q 30/06 | (2012.01) |
| H04L 12/26 | (2006.01) |
| G06F 3/0484 | (2013.01) |
| G06Q 30/00 | (2012.01) |
| G06Q 50/18 | (2012.01) |
| G06F 16/904 | (2019.01) |
| G06F 3/0482 | (2013.01) |
| G06Q 40/00 | (2012.01) |
| G06F 16/30 | (2019.01) |
| G06F 3/0481 | (2013.01) |
| G06F 9/445 | (2018.01) |
| G06F 21/53 | (2013.01) |
| G06F 21/57 | (2013.01) |

(52) U.S. Cl.
CPC ........ *G06F 3/0486* (2013.01); *G06F 3/04847* (2013.01); *G06F 9/451* (2018.02); *G06F 9/461* (2013.01); *G06F 9/4881* (2013.01); *G06F 9/5038* (2013.01); *G06F 9/547* (2013.01); *G06F 11/14* (2013.01); *G06F 11/3006* (2013.01); *G06F 11/3452* (2013.01); *G06F 16/248* (2019.01); *G06F 16/2423* (2019.01); *G06F 16/24578* (2019.01); *G06F 16/27* (2019.01); *G06F 16/30* (2019.01); *G06F 16/904* (2019.01); *G06F 16/951* (2019.01); *G06F 40/18* (2020.01); *G06F 40/186* (2020.01); *G06Q 10/067* (2013.01); *G06Q 10/0635* (2013.01); *G06Q 10/06314* (2013.01); *G06Q 10/06315* (2013.01); *G06Q 10/06393* (2013.01); *G06Q 30/018* (2013.01); *G06Q 30/0603* (2013.01); *G06Q 30/0635* (2013.01); *G06Q 30/0641* (2013.01); *G06Q 40/12* (2013.12); *G06Q 50/184* (2013.01); *H04L 41/0803* (2013.01); *H04L 41/0843* (2013.01); *H04L 41/0893* (2013.01); *H04L 41/12* (2013.01); *H04L 41/22* (2013.01); *H04L 43/045* (2013.01); *H04L 43/08* (2013.01); *H04L 43/50* (2013.01); *H04L 63/10* (2013.01); *H04L 63/1433* (2013.01); *H04L 63/20* (2013.01); *H04L 67/26* (2013.01); *H04L 67/32* (2013.01); *G06F 3/0484* (2013.01); *G06F 9/44505* (2013.01); *G06F 21/53* (2013.01); *G06F 21/577* (2013.01); *H04L 41/0879* (2013.01); *H04L 67/12* (2013.01); *H04L 67/34* (2013.01)

(58) Field of Classification Search
USPC .................................................. 705/26.81
See application file for complete search history.

(56) References Cited

U.S. PATENT DOCUMENTS

| | | |
|---|---|---|
| 6,678,887 B1 | 1/2004 | Hallman |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,610,512 B2 | 11/2009 | Trinon |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Garber |
| 7,925,981 B2 | 4/2011 | Pourheidari |
| 7,930,396 B2 | 4/2011 | Trinon |
| 7,945,860 B2 | 4/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,535,737 B2 | 9/2013 | Tieu et al. |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 8,983,982 B2 | 3/2015 | Rangarajan |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,508,051 B2 | 11/2016 | Falk |
| 9,535,674 B2 | 1/2017 | Cooper |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 10,467,599 B1* | 11/2019 | Gardner ................ G06F 40/186 |
| 2002/0062218 A1 | 5/2002 | Pianin |
| 2006/0136274 A1* | 6/2006 | Olivier .................. G06Q 40/00 705/4 |
| 2011/0093361 A1* | 4/2011 | Morales ............. G06Q 30/0603 705/26.62 |
| 2012/0078731 A1 | 3/2012 | Linevsky et al. |
| 2013/0278492 A1* | 10/2013 | Stolarz ..................... G06F 3/01 345/156 |
| 2014/0195370 A1* | 7/2014 | Devasia ............. G06Q 30/0633 705/26.7 |
| 2014/0200942 A1* | 7/2014 | Benjamin .......... G06Q 10/1093 705/7.18 |
| 2016/0086257 A1* | 3/2016 | Collins ............. G06Q 30/0641 705/27.1 |
| 2016/0189275 A1* | 6/2016 | Velusamy .......... G06Q 30/0633 705/26.8 |

(56) References Cited

U.S. PATENT DOCUMENTS

2017/0098284 A1* 4/2017 Schneider .............. G06Q 50/01
2017/0132693 A1* 5/2017 Fishman ............ G06Q 30/0643

OTHER PUBLICATIONS

"About the Shopping Cart," Amazon, retrieved from the Internet: URL: https://www.amazon.com/gp/help/customer/display.html?nodeId=468468 [retrieved on Aug. 9, 2017].
"Wish List," Amazon, retrieved from the Internet: URL: https://www.amazon.com/hz/wishlist/intro [retrieved on Aug. 9, 2017].

* cited by examiner

SERVICE OFFERING WISH LIST ORDERING INTERFACE AND CONFLICT SCHEDULING CALENDAR SYSTEM

RELATED CASES

This application claims priority to and benefit of U.S. Provisional Patent Application Ser. 62/568,087, filed Oct. 4, 2017, entitled "Platform Computing Environment and Functionality thereof," by Amradkar, et. al, for all applicable purposes, including a right of priority, the contents of which are incorporated by reference herein, in their entirety.

TECHNICAL FIELD

Embodiments described herein generally relate to enterprise computing and in particular to providing a wish list ordering interface and a conflict scheduling calendar interface for a service portal. The service portal may be hosted on cloud based infrastructure. The service portal may provide support operations for information technology staff to assist employees of a corporation and operational aspects pertaining to technical support of that corporation's internal technical infrastructure.

BACKGROUND

Cloud computing relates to the sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Within the context of cloud computing solutions, support personnel may be asked to deal with higher expectations of response time to infrastructure issues. The goal of most enterprise systems, and cloud computing systems in particular, is very high availability. Accordingly, users of enterprise systems have grown accustom to nearly 100% availability of all enterprise functions. One important aspect of maintaining such high availability is the ability to accurately and quickly address software upgrades and maintenance in a controlled manner with minimal disruption to the customer. The disclosed techniques for providing an internal wish list ordering of product offerings and specialized calendar conflict scheduling methods address these and other issues.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
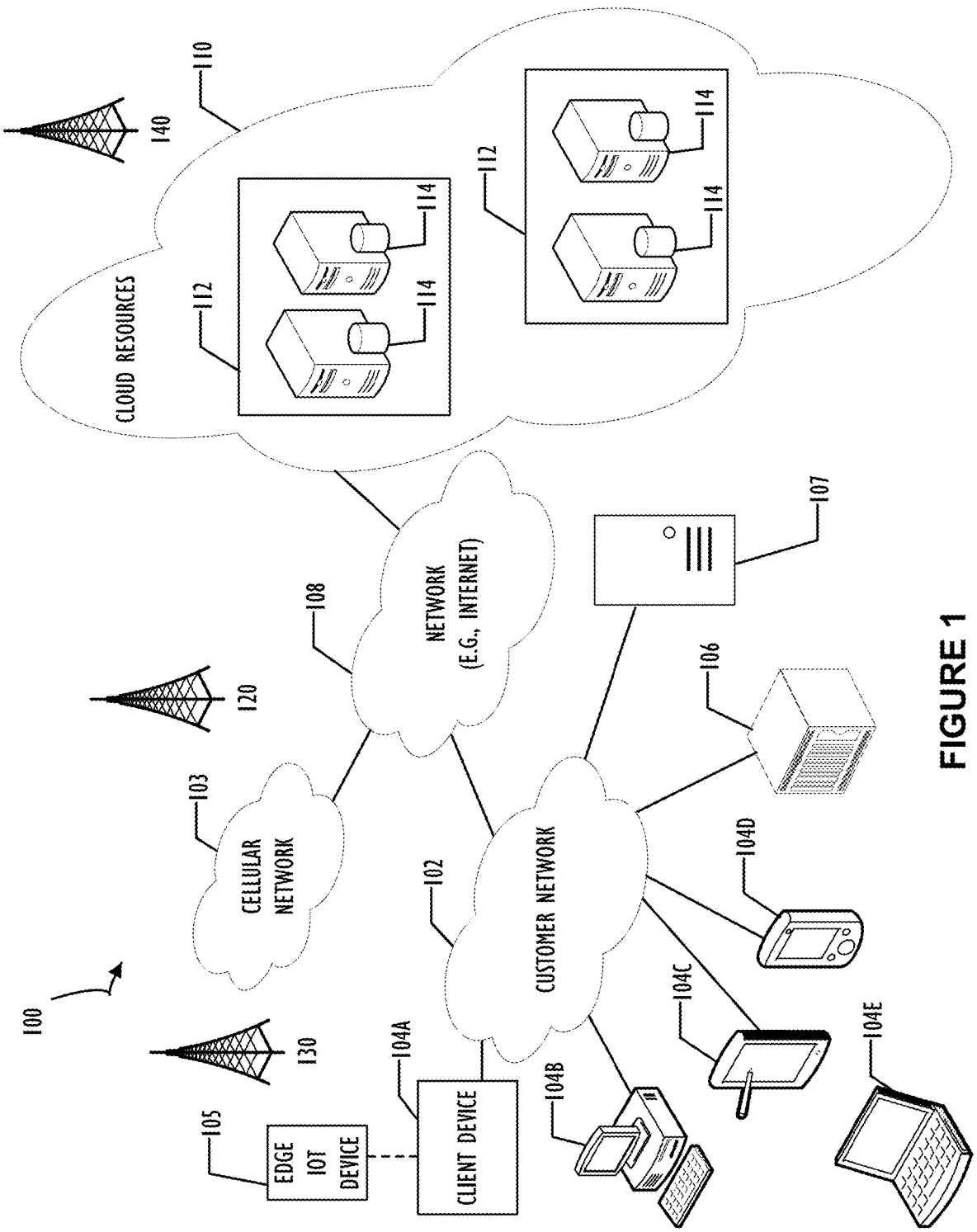
FIG. 1 illustrates a block diagram of an embodiment of a cloud computing infrastructure 100 where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the terms "application" and "function" refer to one or more computing modules, programs, processes, workloads, threads and/or a set of computing instructions executed by a computing system. Example embodiments of applications and functions include software modules, software objects, software instances and/or other types of executable code.

A service portal represents an interface, typically web based, that allows employees of a corporation to request product offerings, request infrastructure assistance, and generally obtain services provided internally to that corporation. For the purposes of this disclosure, ordering of product offerings from a service catalog and performing conflict detection for requested infrastructure updates will be the focus. However, this is not intended to imply that a service portal is limited in any way to these two capabilities. Service portals may provide additional operations and some of the disclosed techniques may be applicable to those other operations but for ease of understanding this disclosure will utilize examples only pertaining to ordering of product offerings and conflict detection and resolution of detected conflicts.

A wish list capability in a service portal product ordering interface may provide for a user to select an item for future ordering and have all attributes of the selected items persist in a user visible work area until such time as the order is placed. While in the wish list the user may adjust the attributes and have the ability to adjust the configuration of the items in the wish list such that they are accurate at the time of placing the actual order. The wish list may also act as a "save for later" list, where incomplete forms may be saved without having to honor mandatory requirements. That is, items that have "required fields" will not have to have those fields designated as required be populated while they are saved in a wish list. While in the wish list, the forms that represent the configurations of the underlying product offerings may be iteratively updated and saved multiple times as needed. A user may access their personalized wish list of items at any point in time to either remove an item, add an item, update an item or order/submit the wish list to a fulfillment team. The fulfillment team may utilize items that were originally maintained in a wish list in the same manner as any other order request and may be agnostic as to the use of a wish list process. That is, the use of wish list ordering capability may have no effect on downstream processes already in place in a corporation.

Examples of items (e.g., product offerings) that may be available via a service catalog and thereby made available to the wish list capabilities as described in this disclosure include a variety of tangible and service oriented offerings. For example, infrastructure such as office supplies, information technology equipment, airline tickets, and hotel reservations represent tangible offerings. Additionally, a request for a service to be performed, such as trouble shooting a problem (e.g., an incident report), scheduling a training session, moving equipment or office furniture, etc. are examples of services that may be requested via a service catalog. In general, any type of support provided by a corporation to its employees may be made available via that company's service portal and thus may benefit from using the disclosed wish list techniques as part of the ordering interface.

As briefly mentioned above, a wish list capability may allow users to select a product offering from a service catalog and progressively update attributes of that offering in a personalized work space prior to submitting the order for fulfillment (e.g., wish list). For example, a user may wish to travel to London for a meeting with a client at a future undefined date. That user may, via the service catalog of the service portal, select a product offering representing air travel to London and save it to their wish list. The user may then select from different options such as travel dates, class of travel, carrier, duration of stay, etc. without actually placing the order. By saving an in-progress order to a wish list, the user is not required to honor the order form's mandatory fields and may "work" with the item in an "incomplete" state and have the selections they have made persist for later retrieval. Of course, mandatory fields may be required to be completed by the system prior to actually submitting the order for fulfillment but may be allowed to exist "undefined" in the wish list work space for the convenience of the user. By way of example, a user using the disclosed wish list technique could hypothetically schedule the entire trip to London and know the cost of the trip prior to presenting a request for said travel to their management. Accordingly, that user may be able to properly present the request along with any potential budgetary impact that management may be concerned about.

In another example, a user may desire a new company supplied cell phone (or some other hardware such as a laptop or tablet computer system, a memory upgrade, or possibly new software, etc.) at some point in the future. That user may select a cell phone from the available product offerings of the company service catalog and save it in their wish list. Over time, the user may alter the configuration of the cell phone to determine desired capabilities while watching budgetary constraints. Later, the user may have a need for another offering and create a consolidated request (the immediate need and the desired cell phone) to their management for approval. Thus, this user has only impacted management with one consolidated approval cycle to address their needs rather than creating two separate approval and fulfillment cycles. In this manner, users may reduce overall cost to the corporation by streamlining and reducing the number of approval and fulfillment cycles.

In addition to a wish list work space that allows for alteration of attributes of product offerings prior to those items being placed in a virtual shopping cart, disclosed techniques allow for an update cart capability and a bundle of offerings capability. The update cart capability differs from prior art examples of web based shopping interfaces in that it allows for items within a shopping cart to have their attributes altered. In prior art solutions, when an attribute of an item within a shopping cart is altered, the resulting shopping cart contains two items. The two items represent the one that was originally within the shopping card and a second item with the new attribute. For example, if a shopping cart has a T-shirt of size large in it and a user attempts to change the size of the T-shirt to medium, the resulting prior art shopping cart solution will contain two of the same T-shirts with one a medium and the other a large. By adding an update cart capability as disclosed herein, the user is able to "edit" not only the shopping cart but items within the shopping cart. Thus, the user is saved from having to remove unwanted items from their shopping cart when attributes of those items are changed.

A bundle capability is another enhancement that may allow for repetitive ordering tasks via a service catalog of a service portal to be less time consuming. A bundle represents a user defined grouping of product offerings that may be ordered together. The bundle may represent a container of the user defined grouping and allow each offering within the group to have its own default configuration. Bundles may be localized to a specific user or may be shared across groups of individuals that may have to perform similar tasks. Bundles may be associated with a type attribute such as new hire, termination, relocation, etc. to allow a user to search based on bundle type that might assist with an administrative action being performed. A search capability may also be provided to allow searching for bundles based on underlying product offerings stored within a bundle. For example, a user may search for a bundle including a cell phone and a laptop and find a bundle that includes both the cell phone and the laptop along with a data cable to connect the two. In other words, users may have a general idea of product offerings they would like to acquire and may look for representative bundles of those product offerings and additional items that may be useful with what they originally wanted to order.

One common example that may benefit greatly from the disclosed bundle capability is the process of onboarding a new hire into a corporation. For example, consider that a new sales person is scheduled to start for a corporation in the near future (or has possibly started) and the corporation would like to request all required infrastructure via the company's internal fulfillment process. In this example, the new sales person requires a company logo shirt, a laptop computer, a cell phone, and a computer access account. A bundle may already exist to place one collective order for these seemingly unrelated product offerings. If not, a bundle may be created and possibly titled "new salesperson startup" to allow the single order to be placed. Clearly, when the next sales person is hired that same "new salesperson startup" bundle may be used to save time and increase consistency for the corporation. Note that bundles store a default configuration for underlying items and each item may be altered either prior to or after being copied to the shopping cart. As mentioned above, prior art solutions do not allow the altering of attributes after being copied to a shopping cart but disclosed techniques do allow for that. Further, in this example each new hire may have a different shirt size and may have different needs for their cell phone or other offering contained within the bundle. Accordingly, disclosed techniques allow for the bundle to act in a similar manner to the disclosed wish list by both deferring required field population and allowing for iterative updates to alter attributes. In this use case example, the new hire bundle contains a set of pre-selected offerings and allows a starting point whereby the user can populate their shopping cart and then complete the configuration attributes as required on a per offering basis to customize the order for a particular new hire. Additionally, multiple bundles may be selected, completed (i.e., complete configuration attributes), and copied into a shopping cart such that only one approval, fulfillment cycle is required to obtain all required infrastructure for the new hire. Note that the bundle of this example includes tangible items to be delivered to the new hire and a service to be provided for the new hire in one comprehensive request (e.g., a computer access account).

According to disclosed techniques, bundles may represent a short cut to the shopping and ordering process and may save time by allowing re-use of previously determined information. Bundles may be updated over time to change the underlying product offerings or to change the default attributes of the underlying product offerings. Bundles may be used to augment a shopping cart of a user or to replace the current shopping cart of the user. Further information about a product offering interface utilizing bundles and wish list capabilities is discussed below with reference to FIGS. 3-8.

Conflict detection and scheduling of infrastructure changes represent capabilities of a service portal in addition to the above discussed service catalog. Conflicts may exist for a variety of reasons including but not limited to, resource availability to perform updates (e.g., staff), blackout windows where no updates are allowed, predicted high usage windows, availability requirements, technical compatibility issues, etc. The disclosed conflict calendar resolution interface may provide a convenient mechanism for scheduling technology updates while taking into account outside scheduling parameters that may give rise to conflicts. Techniques for presenting schedule information and an intuitive drag and drop interface for a conflict calendar resolution system are discussed in more detail below with reference to FIGS. 9-11.

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks, Bluetooth®). Wi-Fi is a registered trademark of the Wi-Fi Alliance. Bluetooth is a registered trademark of Bluetooth Special Interest Group. In another embodiment, customer network 102 represents an enterprise network that could include or be communicatively coupled to one or more local area networks (LANs), virtual networks, data centers, and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. FIG. 1 also illustrates that customer network 102 may be connected to a computer configured to execute a management, instrumentation, and discovery (MID) server 107. For example, MID server 107 may be a Java application that runs as a Windows service or UNIX daemon. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices, such as wireless access points and routers (e.g., local compute resource 106). In addition, the mobile devices may interact with other mobile devices or with non-mobile devices such as desktop computer 104B and various types of client devices 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various enterprise, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

Figure 2:
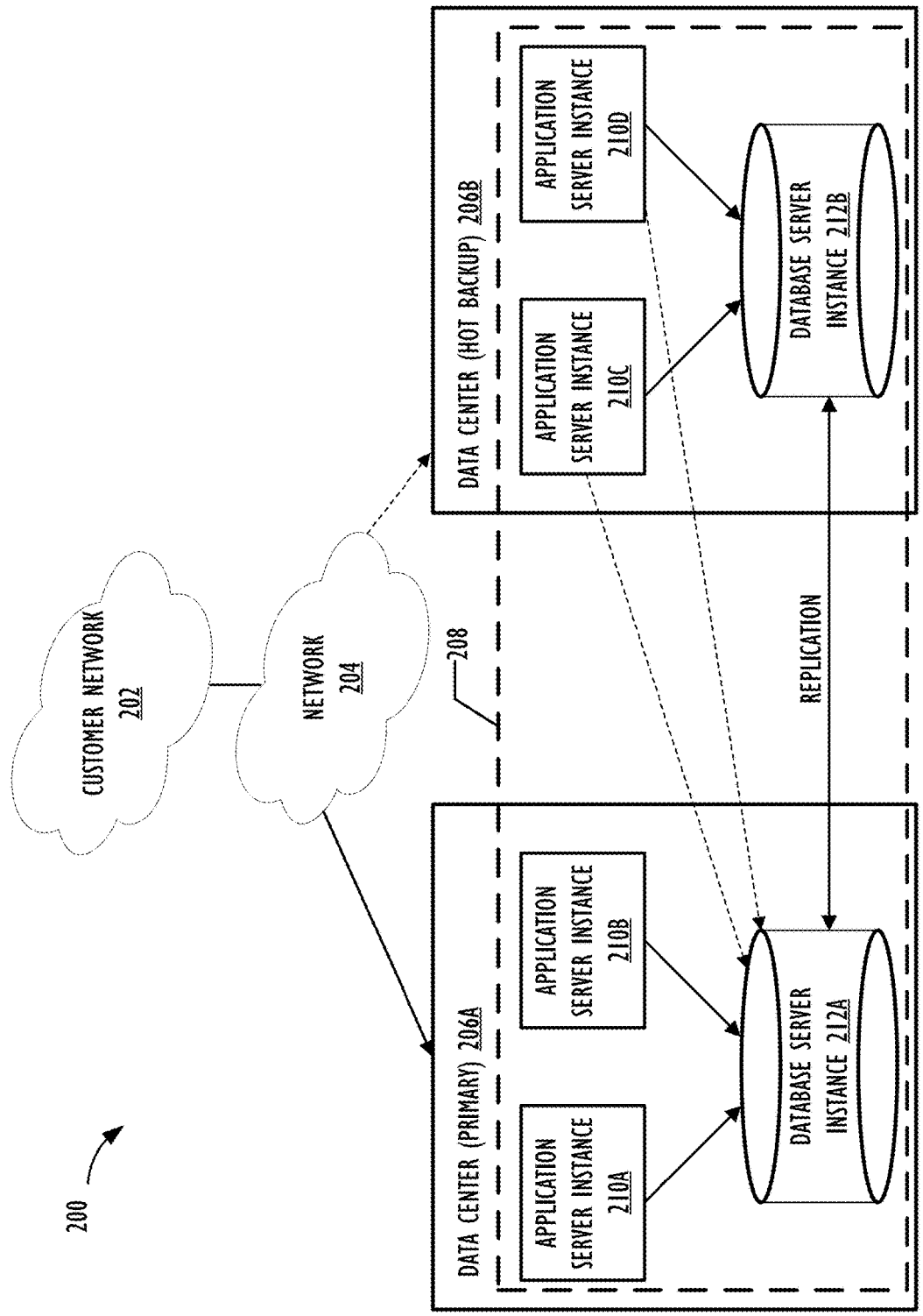
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects to two data centers 206A and 206B via network 204. Customer network 202 and network 204 may be substantially similar to customer network 102 and network 108 as described in FIG. 1, respectively. Data centers 206A and 206B can correspond to FIG. 1's data centers 112 located within cloud resources platform/network 110. Using FIG. 2 as an example, a customer instance 208 is composed of four dedicated application server instances 210A-210D and two dedicated database server instances 212A and 212B. Stated another way, the application server instances 210A-210D and database server instances 212A and 212B are not shared with other customer instances 208. Other embodiments of the multi-instance cloud architecture 200 could include other types of dedicated server instances, such as a web server instance. For example, the customer instance 208 could include the four dedicated application server instances 210A-210D, two dedicated database server instances 212A and 212B, and four dedicated web server instances (not shown in FIG. 2).

To facilitate higher availability of the customer instance 208, application server instances 210A-210D and database server instances 212A and 212B are shown to be allocated to two different data centers 206A and 206B, where one of data centers 206A and 206B may act as a backup data center. In reference to FIG. 2, data center 206A acts as a primary data center that includes a primary pair of application server instances 210A and 210B and primary database server instance 212A for customer instance 208, and data center 206B acts as a secondary data center to back up primary data center 206A for a customer instance 208. To back up primary data center 206A for customer instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master My SQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for the customer instance 208 to be diverted to the second data center 206B during a failure and/or maintenance scenario. Using FIG. 2 as an example, if application server instances 210A and MOB and/or primary data server instance 212A fails and/or is under maintenance, data traffic for customer instances 208 can be diverted to secondary application server instances 210C and 210O and secondary database server instance 212B for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210A-210D and database server instances 212A-212B can be combined into a single server instance. The use and discussion of FIGS. 1 and 2 are only examples to facilitate ease of description and explanation.

Figure 3A:
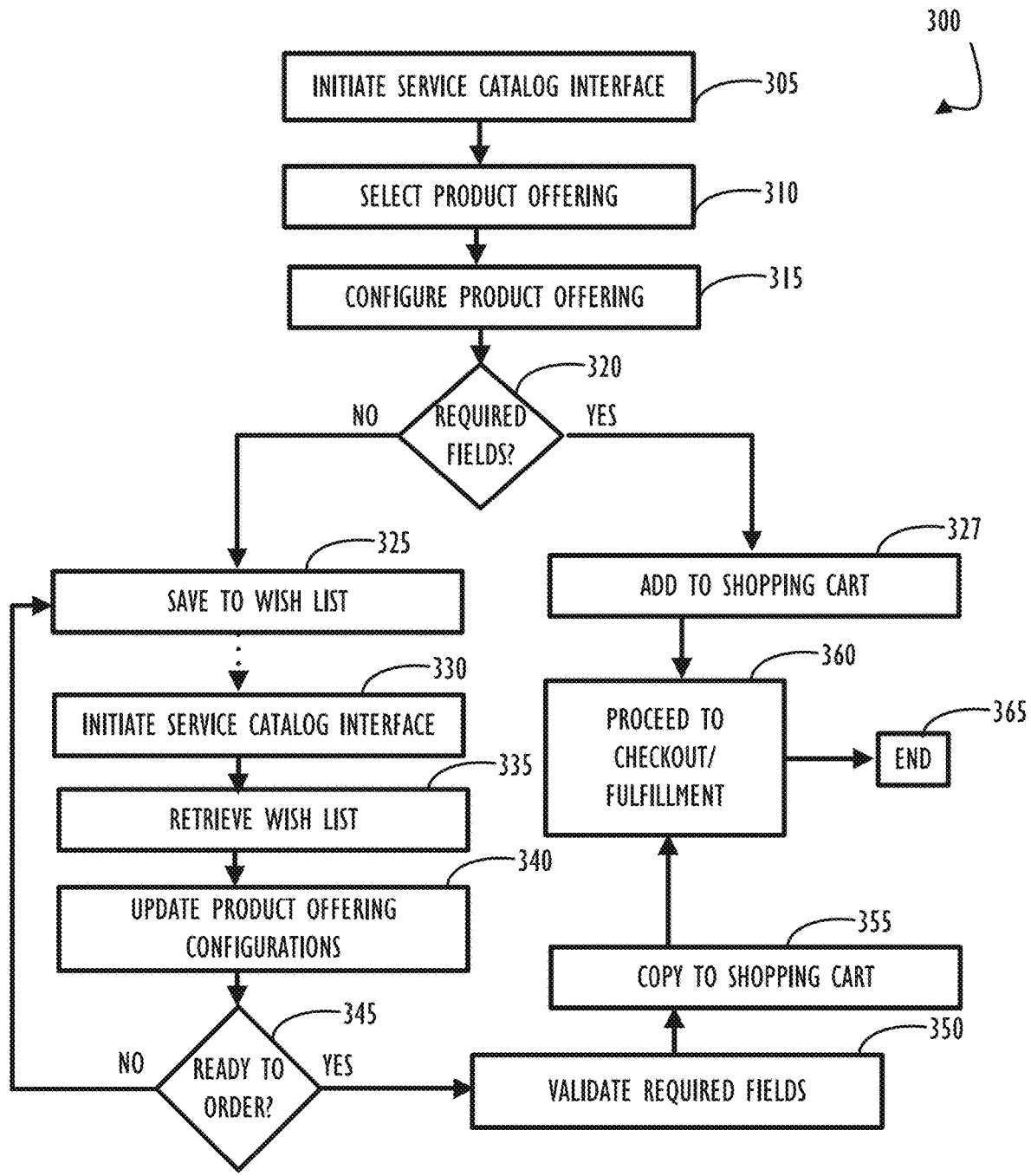
FIGS. 3A-B illustrate flow diagrams 300 and 370 for one possible embodiment for a wish list ordering interface according to the present disclosure.

Referring now to FIG. 3A, flow diagram 300 illustrates one possible process flow of a service portal ordering system including a wish list capability according to some disclosed embodiments. Beginning at block 305, a service catalog interface may be initiated. For example, an end-user may request a web browser display information from a universal resource locator (URL) directed to a service catalog feature of a service portal. At block 310, an end-user may select one or more product offerings from available product offerings of services and products supplied internally to the organization. Note that an internally supplied product may have to actually be ordered from an outside vendor but this is hidden, in this example embodiment, from the end-user. At block 315, the selected product offerings may be individually configured as desired. Decision 320 indicates that an end-user may not wish to submit the order at this time and if all required fields are not completed (the NO prong of 320) the one or more product offerings in their current state of partial configuration may be saved to a wish list for later (block 325). If all required fields are completed (the YES prong of 320), the end-user may wish to add items directly to a shopping cart as in prior-art solutions and shown in block 327. The dashed line between blocks 325 and 330 indicate that time may pass between these steps. At any later time, block 330 indicates that a end-user may again initiate the service catalog interface and retrieve their previous wish list (block 335). Block 340 indicates the end-user may now continue their configuration of the product offerings without losing previously defined information because it was maintained within the wish list workspace for that end-user. Decision 345 indicates that if the end-user is not yet ready to order (the NO prong of 345) the product offerings may again be saved with any additional configuration information to the wish list (return to block 325). This process of incremental update may happen any number of times. However, if the end-user is now ready to order (the YES prong of decision 345), flow continues to block 350 where required fields may be validated and items copied to the end-user's shopping cart (block 355). Items in a shopping cart from either block 327 or block 355 may be submitted in an actual order as indicated at block 360 and example process flow 300 ends at block 365.

Figure 3B:
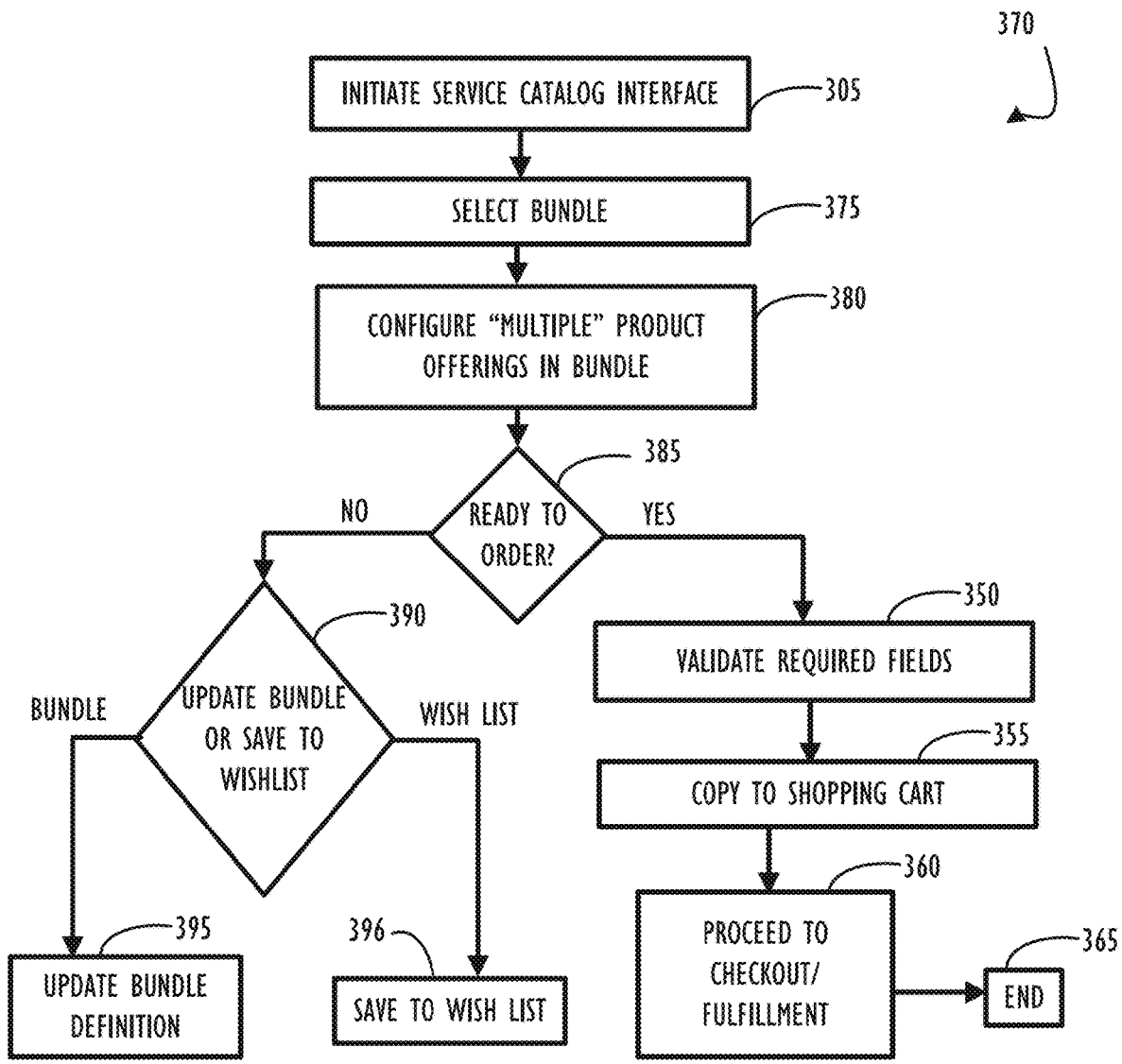

Referring now to FIG. 3B, flow chart 370 illustrates one possible flow of a service portal ordering system with a bundle capability according to some disclosed embodiments. Block numbers for similar or identical operations have been maintained from flow chart 300 of FIG. 3A. Beginning at block 305, a service catalog interface may be initiated. For example, an end-user may request a web browser display information from a URL directed to a service catalog feature of a service portal. At block 375, an end-user may select one or more product offerings to group together as a bundle and supply some initial configuration for each of the one or more product offerings at block 380. The bundle may represent a potentially repetitive order. For example, the new-hire onboarding package discussed above. At decision 385, the end-user may be ready to place the order directly from the saved bundle (optionally adjusting the saved configuration parameters of the bundle). The YES prong of block 385 indicates that the end-user is ready to place the order. Flow continues to block 350 to validate that all required fields have been defined and bundle items are copied to the shopping cart at block 355. Flow then continues to block 360 for checkout/fulfillment and the flow of this example ends at block 365. Returning to decision 385, if the end-user is not yet ready to order (the NO prong of 385) then flow continues to decision 390 where the end-user may decide to save their collected items as a wish list (WISH LIST prong of 390) as indicated by block 396. Alternatively, the end-user may decide to update the bundle definition (BUNDLE prong of 390) as indicated by block 395. In this manner, the end-user may have started with a bundle of product offerings, added configuration information, and a) saved the updated configuration information back to the bundle definition (block 395); b) saved the updated configuration information to their wish list (block 396) without updating any attributes of the underlying bundle; or c) started from a bundle and added configuration information while proceeding directly to an order (YES prong of decision 385). Note, the YES prong of decision 385, in this example, repeats a portion of process flow shown in flow chart 300 from FIG. 3A.

Figure 4:
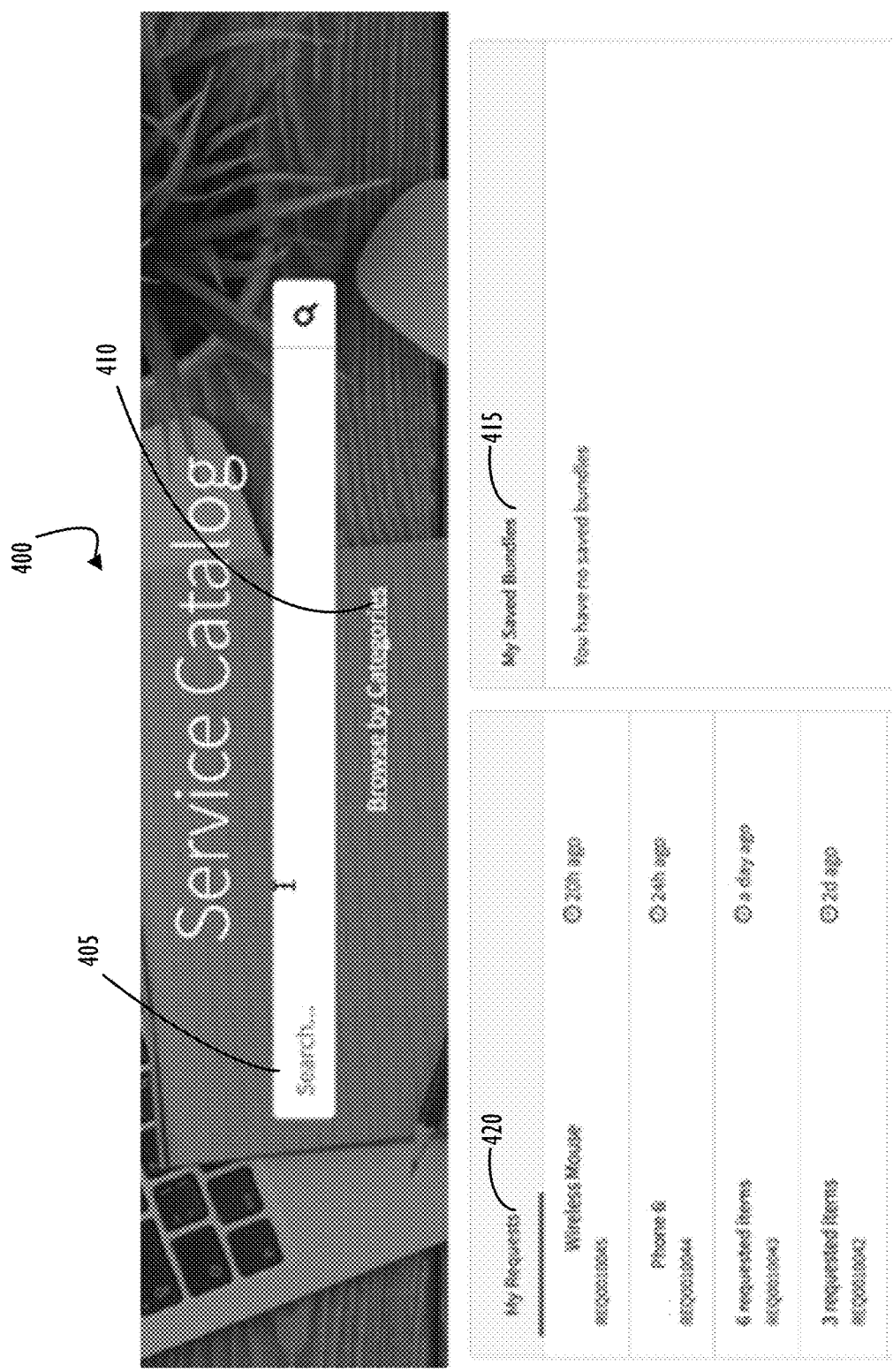
FIG. 4 illustrates a screen shot 400 of an example interface screen as may be shown to an end-user utilizing a wish list ordering capability according to one or more disclosed embodiments.
Figure 5:
FIGS. 5-8 illustrates screen shots 500, 600, 700, and 900 of example interface screens as may be shown to an end-user utilizing a shopping cart with a "bundle" capability as part of a wish list ordering capability according to one or more disclosed embodiments.
Figure 6:
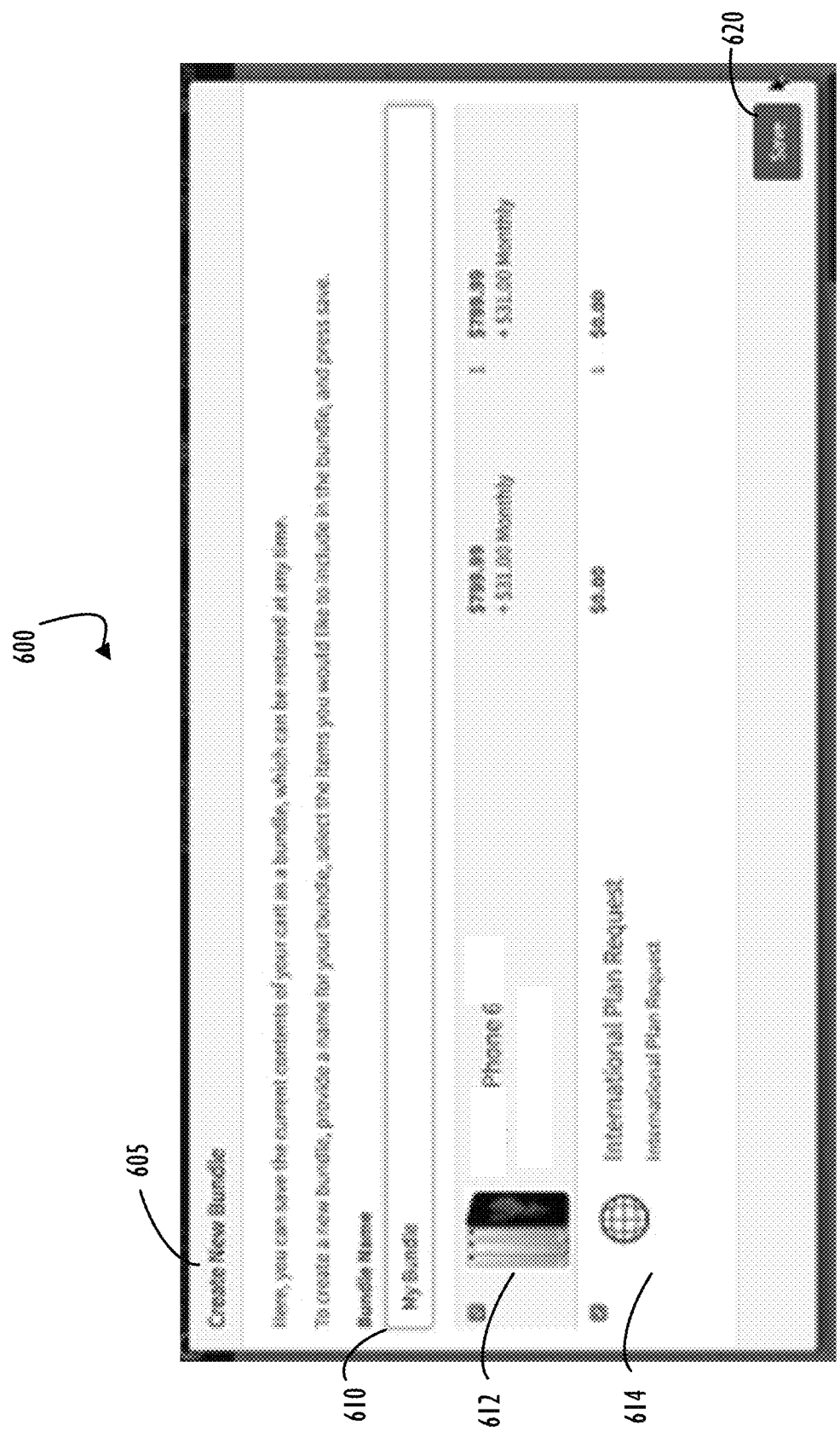
Figure 7:
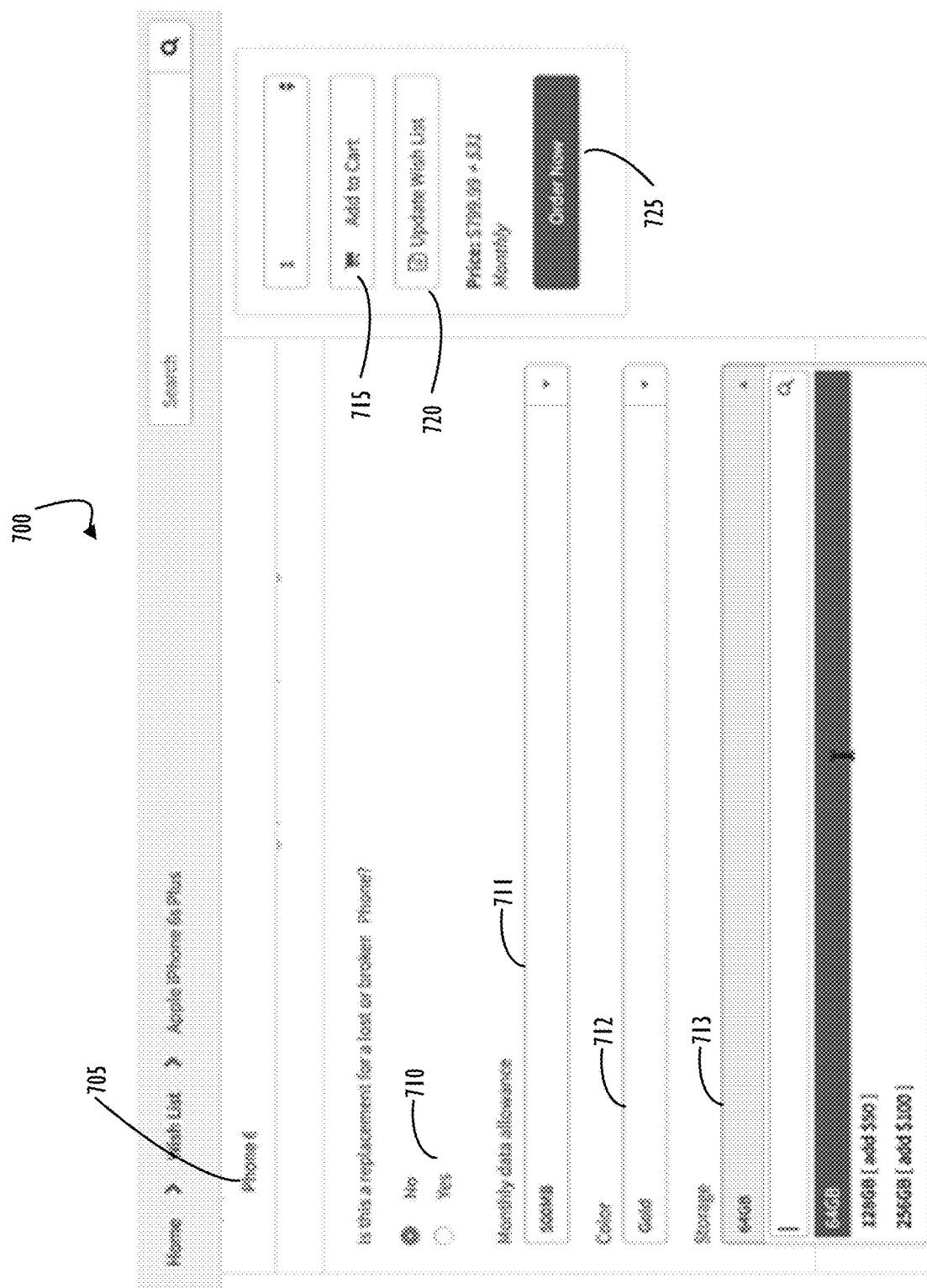
Figure 8:
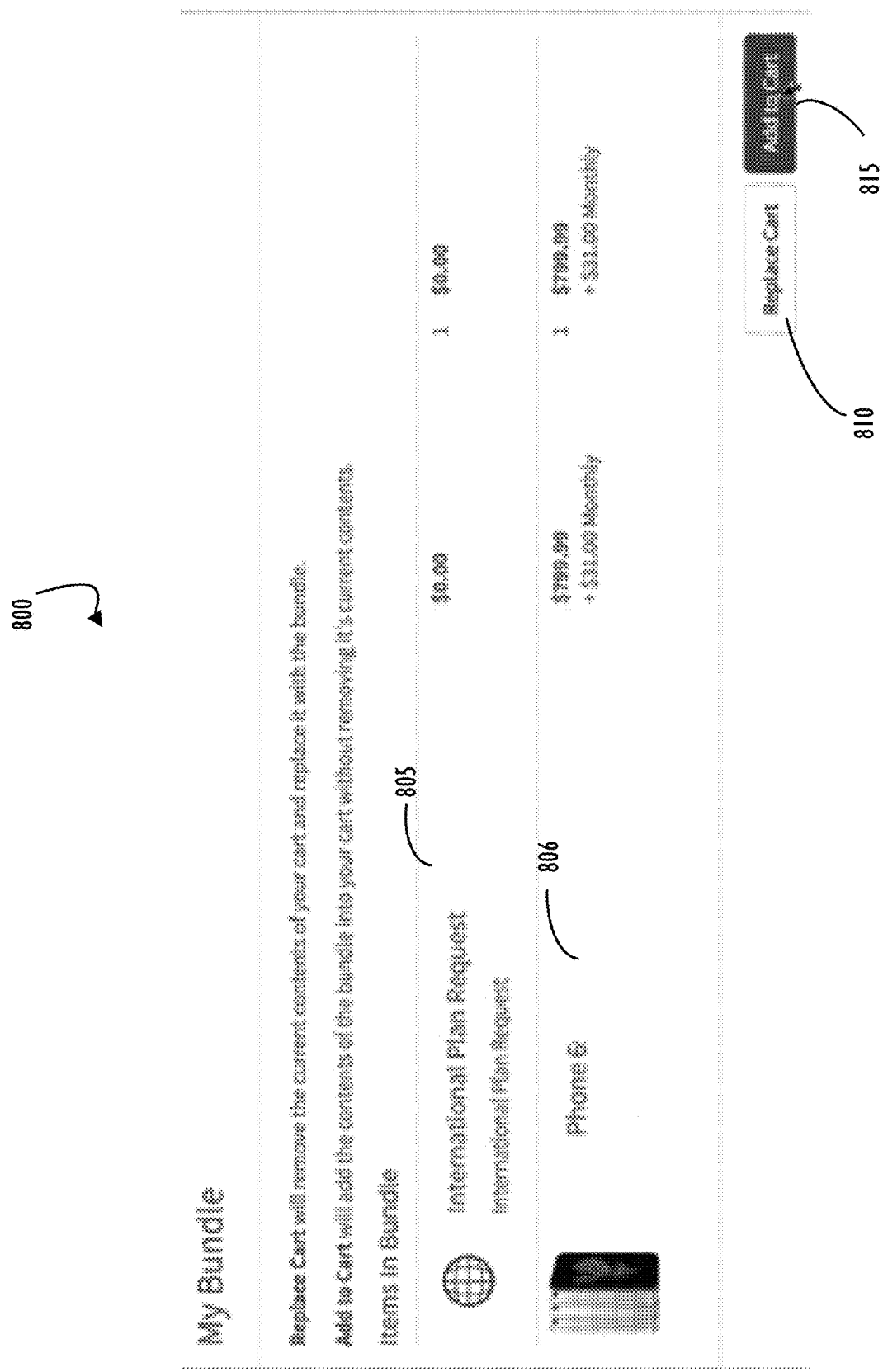

Referring now to FIG. 4, screen shot 400 illustrates an example interface screen for a service catalog as may be shown to an end-user utilizing a wish list ordering capability according to one or more disclosed embodiments. Search area 405 illustrates that an end-user may be able to enter generic search terms to search for a particular product offering. Selection 410 illustrates that an end-user may alternatively, or additionally, browse by category to select a particular product offering. Area 415 illustrates that saved bundles may be made available as a starting point for product offering selection. Area 420 illustrates outstanding requests for product offerings that have been previously been submitted for fulfillment that may allow a user to access and obtain status of their previous requests.

FIGS. 5-8 illustrates screen shots 500, 600, 700, and 800 of example interface screens as may be shown to an end-user utilizing a shopping cart with a "bundle" capability as part of a wish list ordering capability according to one or more disclosed embodiments. Screen shot 500 illustrates a shopping cart 505 that contains two items 510 and 515 illustrating that a shopping cart may contain different types of product offerings. In this example there is a cell phone 515 and an associated international cell phone plan 510 in the cart. As explained above, requests for service and tangible hardware items (along with other offerings) may be grouped together and submitted as one request for fulfillment. Selection box 520 illustrates that an end-user may continue shopping and add more items to a cart prior to submitting an order. Selection box 525 illustrates that an end-user may save the current product offerings, in their current state of configuration, as a bundle for future use. Area 530 illustrates an area where previously saved bundles may be made available for selection by an end-user. Selection box 535 illustrates that a user may clear all items from their cart. Selection box 540 illustrates that an end-user may proceed to checkout/fulfillment to submit items currently in their shopping cart.

Screen shot 600, illustrates a window view 605 showing elements associated with bundle creation according to one or more disclosed embodiments. Text entry area 610 illustrates that the currently selected shopping cart items may be saved as a new bundle called "My Bundle" and contain two items. In this example elements 612 and 614 represent a cell phone 612 and an associated international calling plan 614. As explained above, current contents of a shopping cart may be saved as a bundle that can be restored at any time in the future. Selection box 620 may be selected by an end-user to perform the described save operation.

Screen shot 700 illustrates a configuration screen for a particular product offering according to some disclosed embodiments. Element 705 indicates that in this example the product offering is an phone and has user definable attributes of replacement 710, data allowance 711, color 712, and storage capability 713. Selection box 715 represents a box that when selected by an end-user would add the product offering and its configuration to a shopping cart. Selection box 720 represents a box that when selected by an end-user would save the current configuration (even if not all required fields are defined) to a wish list for future ordering. Selection box 725 represents a box that when selected by an end-user would submit the product offering for fulfillment. Note that screen shot 700 illustrates an example where a configuration screen is shown for adding to a shopping cart, updating a wish list, or ordering. A similar screen would allow for product offering configuration of items in a bundle.

Screen shot 800 illustrates a window representing a view into a bundle, in this case the "My Bundle" as discussed above with FIG. 6. This bundle contains a cell phone plan 805 and its associated cell phone 806. From the bundle screen, selection box 810 illustrates that the bundle may be used to replace the existing shopping cart to simultaneously clear any items currently in the shopping cart and copy the bundle items to the shopping cart. Selection box 815 illustrates that a bundle of items may be added to a cart without altering items currently stored in the end-user's shopping cart. In certain embodiments, a user may have only one wish list but may save any number of bundles for future use. The number of wish lists for a user or bundles for a user are design choices and may not be restricted to the numbers shown in this example embodiment.

Figure 9:
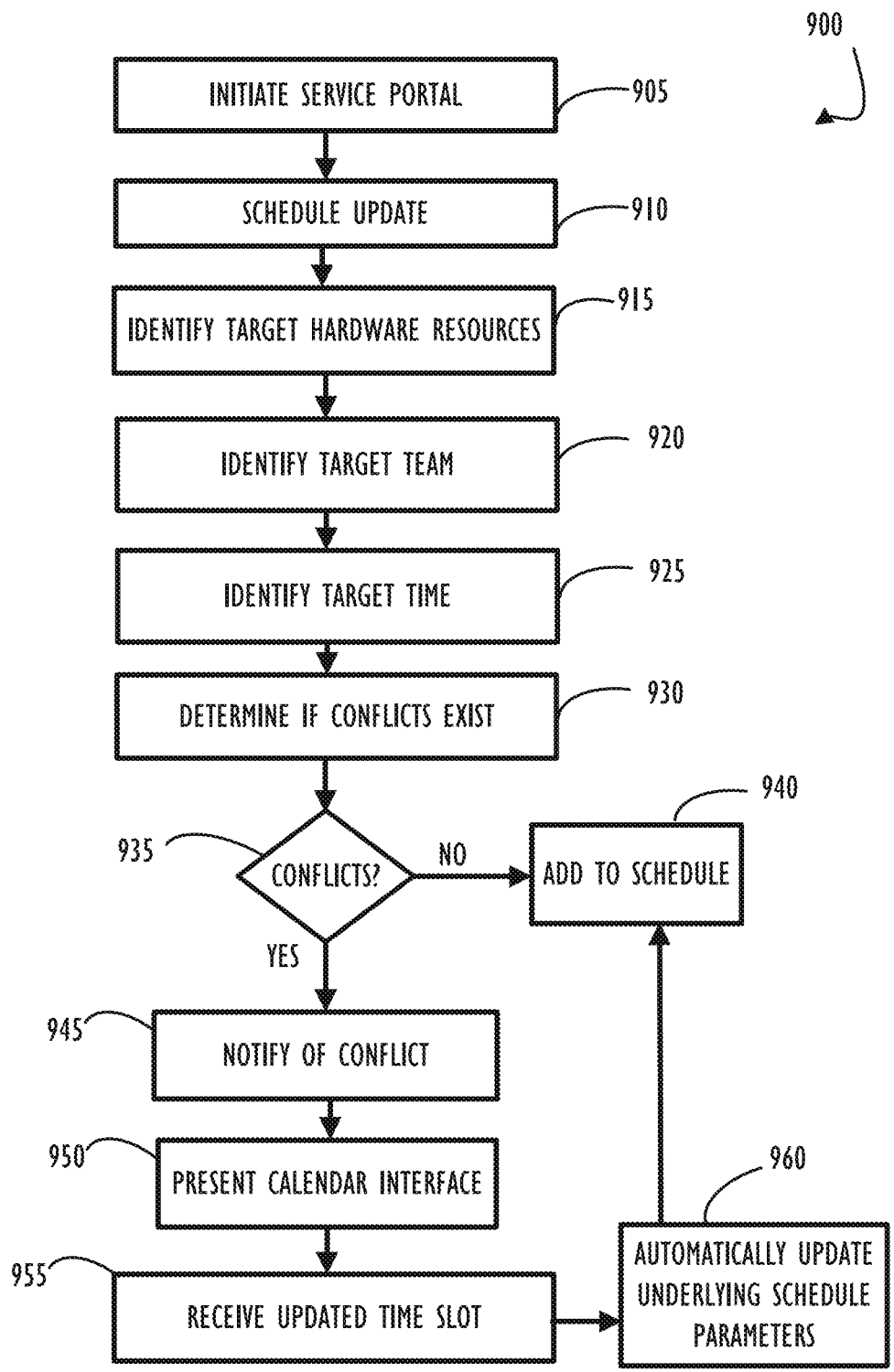
FIG. 9 illustrates a flow diagram 900 for one possible embodiment for a conflict calendar resolution interface according to the present disclosure.

Referring now to FIG. 9, flow diagram 900 illustrates one possible process flow for an embodiment of a conflict calendar resolution interface according to the present disclosure. Beginning at block 905, an end-user may initiate a service portal interface for a scheduling interface in a similar manner as described above for the service catalog operation of a service portal. At block 910, the end-user may request to schedule an update to a portion of the enterprise's information technology infrastructure. For example, an operating system upgrade to a computer server may wish to be scheduled. Block 915 indicates that the end-user may next identify the target hardware resources associated with the update. In this example, the end-user may identify the server computer to receive an operating system upgrade. Block 920 indicates that a team may be either automatically identified or manually identified to perform the upgrade. For example a team of administrators trained for the desired upgrade may be identified. Block 925 indicates that a target time for the upgrade may be identified by the end-user as a desired time frame to perform the upgrade. Block 930 indicates that the system may automatically check schedules of resources to determine if conflicts exist for the requested time frame. As mentioned above, conflicts may exist for a number of reasons including but not limited to team availability, blackout windows, resource availability, technological dependencies pertaining to the upgrade, etc. At decision 935, if no conflicts exist (the NO prong of decision 935) the requested update with its initial end-user defined parameters may be added to a schedule of upgrades for the enterprise at block 940. Alternatively, if conflicts are detected (the YES prong of decision 935) flow continues to block 945 where the end-user may be notified that a conflict exists. Block 950 indicates that the end-user may be presented with a calendar interface according to disclosed embodiments that may assist the end-user in altering the schedule request to avoid existing conflicts. Block 955 indicates that an end-user has adjusted the request, for example using the disclosed calendar interface discussed below with reference to FIGS. 10, 11A, and 11B. Block 960 indicates that, based on the adjustment, the underlying schedule parameters are automatically updated and the update request at the new time may be added to the enterprise update schedule at block 940.

Figure 10:
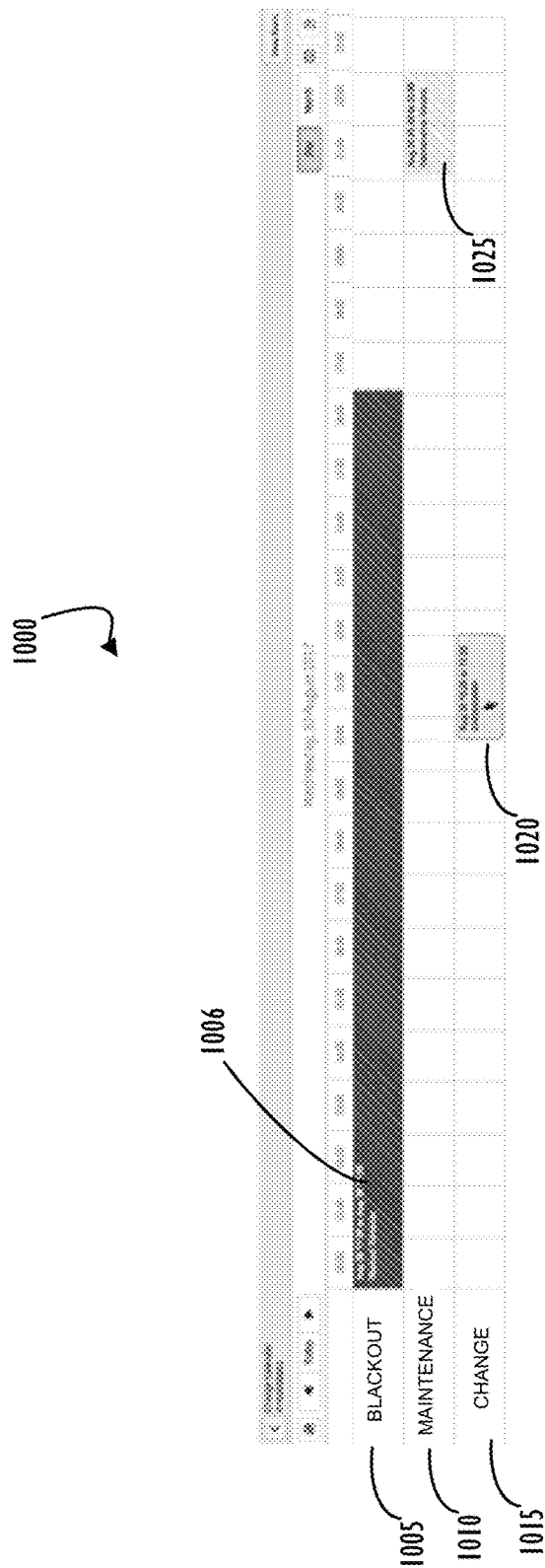
FIG. 10 illustrates a screen shot 1000 of an example interface screen as may be shown to illustrate a conflict detection as part of a conflict calendar resolution capability according to one or more disclosed embodiments.

FIG. 10 illustrates a screen shot 1000 of an example interface screen to illustrate a conflict detection as part of a conflict calendar resolution capability according to one or more disclosed embodiments. In this example, three items are shown in a timeline calendar view relative to a single change request. Blackout period 1005 is depicted on a schedule screen with hash-mark time duration 1006. Maintenance timeline 1010 illustrates an available maintenance window 1025. Change timeline 1015 represents a currently requested schedule update 1020. As shown in screen shot 1000, requested schedule update 1020 conflicts with blackout period 1005. As explained briefly above, different resources may have different blackout periods based on functional needs of enterprise infrastructure. It is common for upgrades to be deferred until time frames when user need for particular resources may be at a minimum. However, in some cases, resources are critical to enterprise functions and may not have any pre-determined maintenance windows. Accordingly, multiple risks and other factors must be considered when performing updates to those critical resources.

Figure 11A:
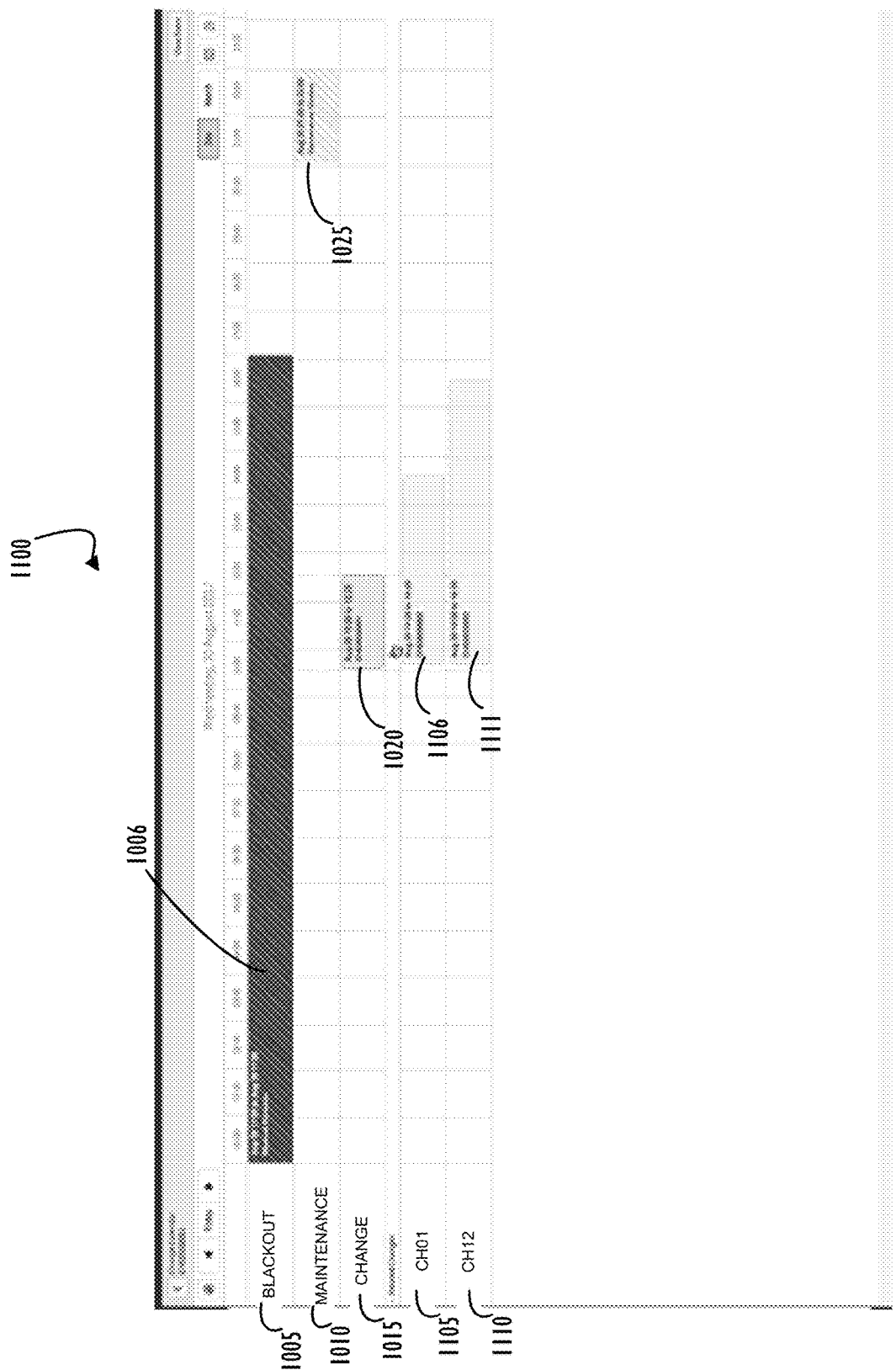
FIG. 11A illustrates a screen shot 1100 of an example interface screen as may be shown to an end-user illustrating a conflict detection and other work item schedules as part of a conflict calendar resolution capability according to one or more disclosed embodiments.
Figure 11B:
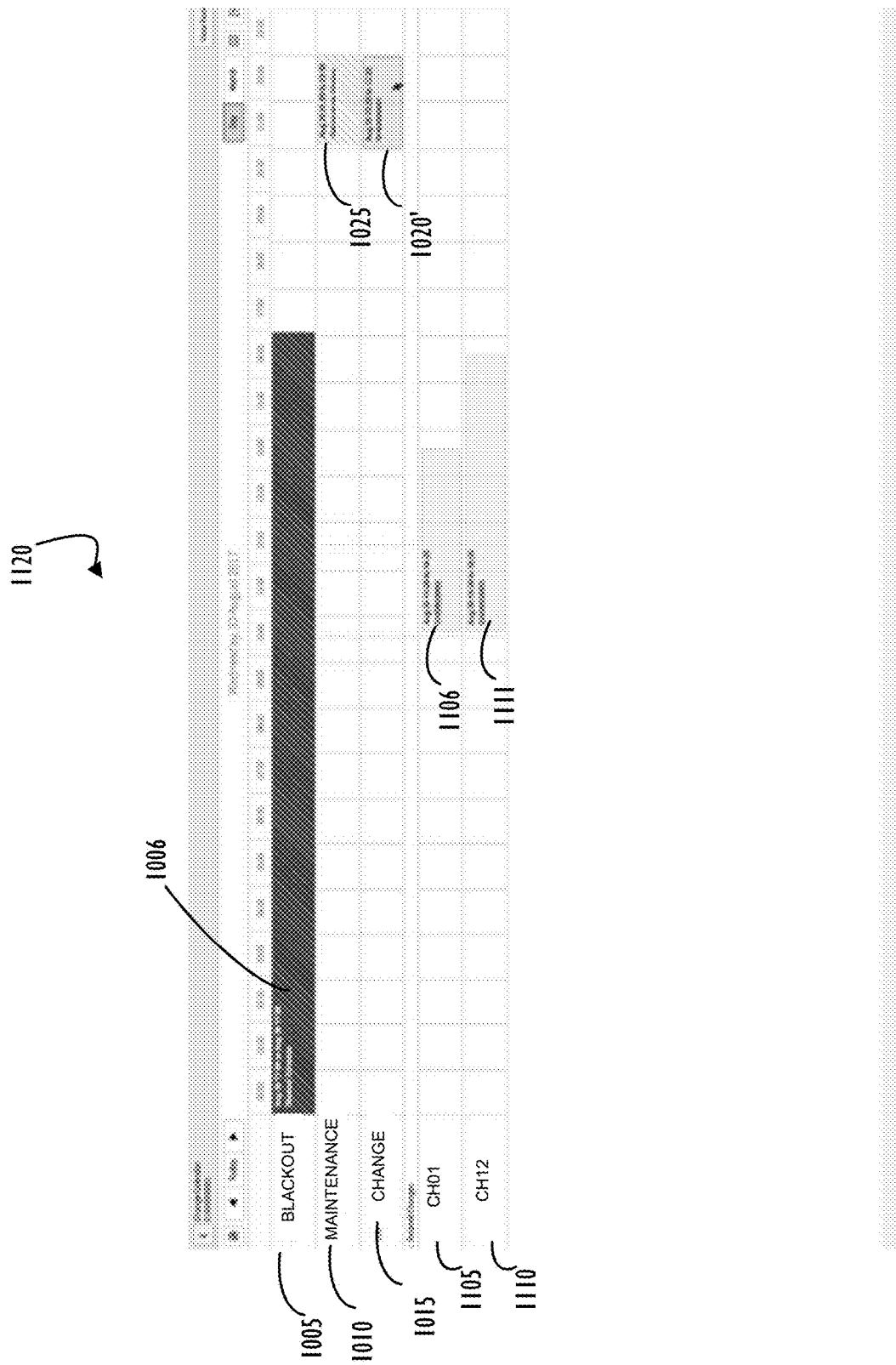
FIG. 11B illustrates a screen shot 1120 of an example interface screen as may be shown to an end-user illustrating the result of a drag and drop of a previously conflicted work item into a conflict free time period as part of a conflict calendar resolution capability according to one or more disclosed embodiments.

FIG. 11A illustrates a screen shot 1100 of an example interface screen as may be shown to an end-user illustrating a conflict detection and other work item schedules as part of a conflict calendar resolution capability according to one or more disclosed embodiments. Screen shot 1100 repeats the elements of screen shot 1000 from FIG. 10 and includes two additional timelines for related changes that may have an influence on conflict resolution. In this example, change number 01 ("CH01") represented by timeline 1105 is scheduled to occur as shown by element 1106 and change number 12 ("CH12") represented by timeline 1110 is scheduled to occur as shown by element 1111. Referring now to FIG. 11B, screen shot 1120 illustrates the result of a "drag and drop" shown by element 1020' moving previously conflicted work item 1020 into a conflict free time period as part of a conflict calendar resolution capability according to one or more disclosed embodiments. In this example, the end-user has dragged element 1020' into a timeslot to match with maintenance timeframe 1025 on maintenance timeline 1015. As explained above with the discussion of FIG. 9, all underlying attributes of the schedule affected by the drag and drop operation may be automatically updated to prevent the need for the end-user to return to the schedule definition page in order to make this update. By showing a comprehensive view as seen in screen shots 1100 and 1120 an end-user may be able to more easily refine a schedule that is conflict free.

Figure 12:
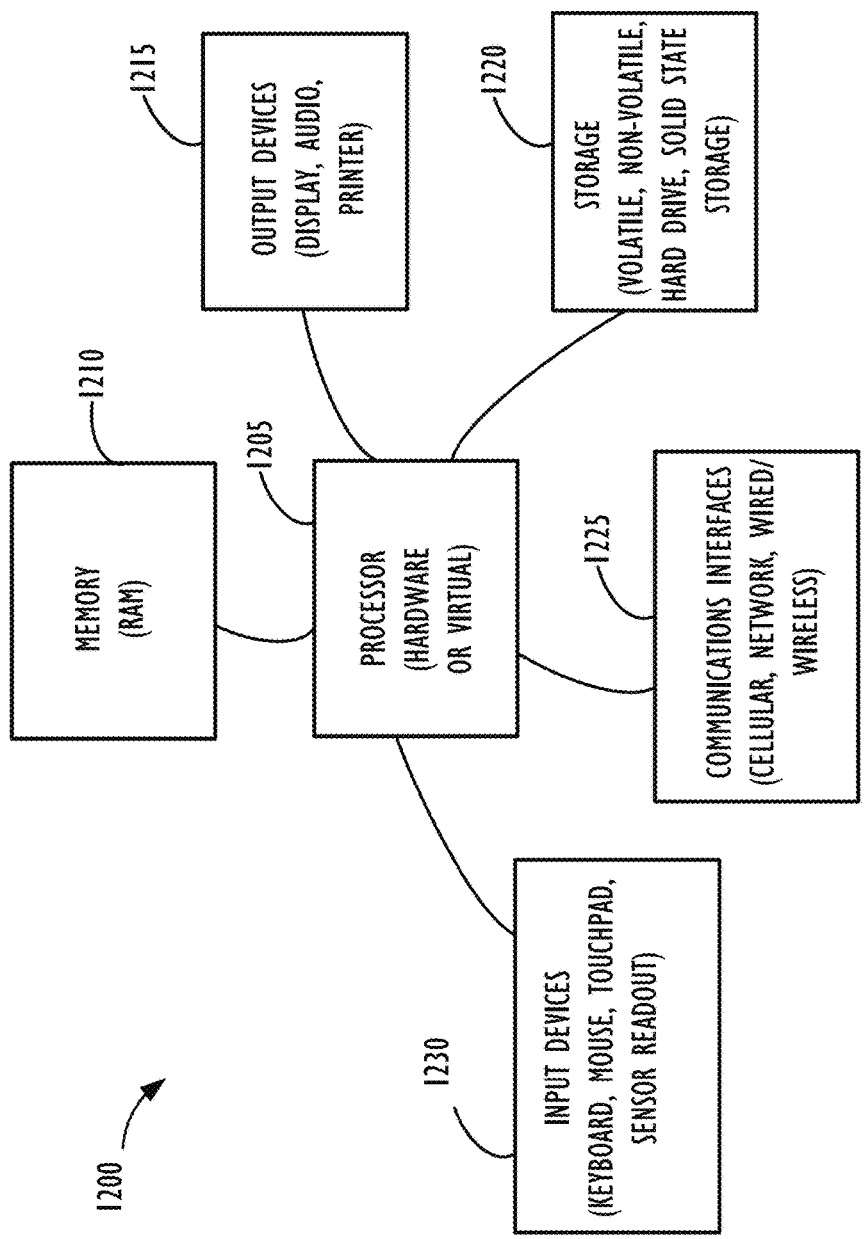
FIG. 12 illustrates a high-level block diagram 1200 of a processing device (computing system) that may be used to implement one or more disclosed embodiments.

FIG. 12 illustrates a high-level block diagram 1200 of a processing device (computing system) that may be used to implement one or more disclosed embodiments (e.g., service provider cloud infrastructure 110, client devices 104A-104E, server instances 112, data centers 206A-206B, etc.). For example, computing device 1200, illustrated in FIG. 12, could represent a client device or a physical server device and could include either hardware or virtual processor(s) depending on the level of abstraction of the computing device. In some instances (without abstraction) computing device 1200 and its elements as shown in FIG. 12 each relate to physical hardware and in some instances one, more, or all of the elements could be implemented using emulators or virtual machines as levels of abstraction. In any case, no matter how many levels of abstraction away from the physical hardware, computing device 1200 at its lowest level may be implemented on physical hardware. As also shown in FIG. 12, computing device 1200 may include one or more input devices 1230, such as a keyboard, mouse, touchpad, or sensor readout (e.g., biometric scanner) and one or more output devices 1215, such as displays, speakers for audio, or printers. Some devices may be configured as input/output devices also (e.g., a network interface or touchscreen display). Computing device 1200 may also include communications interfaces 1225, such as a network communication unit that could include a wired communication component and/or a wireless communications component, which may be communicatively coupled to processor 1205. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 12, processing device 1200 includes a processing element, such as processor 1205, that contains one or more hardware processors, where each hardware processor may have a single or multiple processor cores. In one embodiment, the processor 1205 may include at least one shared cache that stores data (e.g., computing instructions) that are utilized by one or more other components of processor 1205. For example, the shared cache may be a locally cached data stored in a memory for faster access by components of the processing elements that make up processor 1205. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 12, the processing elements that make up processor 1205 may also include one or more other types of hardware processing components, such as graphics processing units (GPUs), application specific integrated circuits (ASICs), field-programmable gate arrays (FPGAs), and/or digital signal processors (DSPs).

FIG. 12 illustrates that memory 1210 may be operatively and communicatively coupled to processor 1205. Memory 1210 may be a non-transitory medium configured to store various types of data. For example, memory 1210 may include one or more storage devices 1220 that comprise a non-volatile storage device and/or volatile memory. Volatile memory, such as random access memory (RAM), can be any suitable non-permanent storage device. The non-volatile storage devices 1220 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 1220 may be used to store overflow data if allocated RAM is not large enough to hold all working data. The non-volatile storage devices 1220 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1205. In one embodiment, the compiling process of the software program may transform program code written in a programming language to another computer language such that the processor 1205 is able to execute the programming code. For example, the compiling process of the software program may generate an executable program that provides encoded instructions (e.g., machine code instructions) for processor 1205 to accomplish specific, non-generic, particular computing functions.

After the compiling process, the encoded instructions may then be loaded as computer executable instructions or process steps to processor 1205 from storage 1220, from memory 1210, and/or embedded within processor 1205 (e.g., via a cache or on-board ROM). Processor 1205 may be configured to execute the stored instructions or process steps in order to perform instructions or process steps to transform the computing device into a non-generic, particular, specially programmed machine or apparatus. Stored data, e.g., data stored by a storage device 1220, may be accessed by processor 1205 during the execution of computer executable instructions or process steps to instruct one or more components within the computing device 1200.

A user interface (e.g., output devices 1215 and input devices 1230) can include a display, positional input device (such as a mouse, touchpad, touchscreen, or the like), keyboard, or other forms of user input and output devices. The user interface components may be communicatively coupled to processor 1205. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 1200 may comprise other components well known in the art, such as sensors, powers sources, and/or analog-to-digital converters, not explicitly shown in FIG. 12.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

The subject matter of this disclosure may be applicable to numerous use cases that have not been explicitly discussed here but are contemplated by this disclosure. For example, the provisional applications filed by the same applicant on May 4, 2017 and May 5, 2017 entitled "Service Platform and use thereof" have further examples. The U.S. Provisional applications given filing Ser. Nos. 62/501,646; 62/501,657; 62/502,258; 62/502,308; and 62/502,244 are hereby incorporated by reference.

What is claimed is:

1. A cloud-based computer system, comprising:
 a memory partition;
 a network interface communicatively coupled to one or more processing units and the memory partition, wherein the memory partition comprises computer instructions that when executed by the one or more processing units cause the cloud-based computer system to:
  provide a service portal operation allowing access to a plurality of end-user operations that include at least a service catalog operation and a change request calendar scheduling operation, wherein the service catalog operation is configured to independently store a plurality of user defined bundles of product offerings in an end-user workspace, and wherein the service catalog operation is configured to provide a search for saved bundles from the plurality of user defined bundles using a bundle name;

the service catalog operation including a wish list ordering operation wherein one or more selected product offerings are maintained in a user wish list prior to order submission and persistent throughout multiple invocations of the service catalog operation, wherein at least one of the one or more selected product offerings is saved with at least one undefined value in a field designated as a required field for order submission;

wherein the at least one undefined value and the user wish list is configured to be updated based on specifying the at least one undefined value in the required field at a subsequent time period; and the change request calendar scheduling operation configured to provide a calendar style view containing information about a requested update concurrently with a view of a plurality of other enterprise scheduling considerations.

2. The cloud-based computer system of claim 1, wherein the change request calendar scheduling operation is configured to provide a calendar style interface allowing drag and drop operations to assist in updating resource scheduling to avoid conflicts with other enterprise scheduling considerations.

3. The cloud-based computer system of claim 1, wherein the change request calendar scheduling operation is configured to automatically update underlying schedule attributes to reflect a result of a drag and drop operation altering a resource schedule.

4. The cloud-based computer system of claim 1, wherein at least one of the plurality of user defined bundles is shared with another user of the service catalog operation.

5. The cloud-based computer system of claim 1, wherein the service catalog operation is configured to provide a second search for saved bundles from the plurality of user defined bundles using generic criteria pertaining to underlying product offerings within a representative saved bundle.

6. The cloud-based computer system of claim 1, wherein the service catalog operation is configured to provide a second search for saved bundles from the plurality of user defined bundles using a bundle type.

7. The cloud-based computer system of claim 1, wherein each one of the plurality of user defined bundles is added to items already in a shopping cart.

8. The cloud-based computer system of claim 1, wherein each one of the plurality of user defined bundles is configured to replace items already in a shopping cart.

9. The cloud-based computer system of claim 1, wherein product offerings stored in a user defined bundle of the plurality of user defined bundles are modified based on specifying the at least one undefined value without changing attributes of the user defined bundle.

10. The cloud-based computer system of claim 1, wherein product offerings stored in a user defined bundle of the plurality of user defined bundles are modified based on specifying the at least one undefined value and modified product offerings are stored as an update to the user defined bundle.

11. The cloud-based computer system of claim 1, wherein attributes of a product offering stored within a shopping cart are automatically altered based on the attributes of the product offering being updated in the user wish list without removing or adding items in the shopping cart.

12. The cloud-based computer system of claim 1, wherein validation of required fields for each product offering stored within the user wish list is performed as part of copying items from the user wish list to a shopping cart.

13. The cloud-based computer system of claim 1, wherein validation of required fields for each product offering stored within a user defined bundle of product offerings of the plurality of user defined bundles is performed as part of copying items from the user defined bundle of product offerings to a shopping cart.

14. A non-transitory computer readable medium storing instructions that when executed by a processor cause the processor to configure a cloud-based computer system to:

provide a service portal operation allowing access to a plurality of end-user functions, the plurality of end-user functions including at least a service catalog operation and a change request calendar scheduling operation;

the service catalog operation including a wish list ordering operation wherein one or more selected product offerings are maintained in a user wish list prior to order submission and persistent throughout multiple invocations of the service catalog operation, wherein at least one of the one or more selected product offerings is saved with at least one undefined value in a field designated as a required field for order submission;

wherein the at least one undefined value and the user wish list is configured to be updated based on specifying the at least one undefined value in the required field at a subsequent time period;

wherein attributes of the one or more selected product offerings stored within a shopping cart are automatically altered based on the attributes of the one or more selected product offerings being updated in the user wish list without removing or adding items in the shopping cart; and the change request calendar scheduling operation configured to provide a calendar style view containing information about a requested update concurrently with a view of a plurality of other enterprise scheduling considerations.

15. The non-transitory computer readable medium of claim 14, wherein the service catalog operation is configured to independently store a plurality of user defined bundles of product offerings in an end-user workspace.

16. The non-transitory computer readable medium of claim 15, wherein at least one of the plurality of user defined bundles is shared with another user of the service catalog operation.

17. The non-transitory computer readable medium of claim 15, wherein the service catalog operation is configured to provide a search for saved bundles from the plurality of user defined bundles using generic criteria pertaining to underlying product offerings within a representative saved bundle.

18. The non-transitory computer readable medium of claim 15, wherein the service catalog operation is configured to provide a search for saved bundles from the plurality of user defined bundles using a bundle name.

19. The non-transitory computer readable medium of claim 14, wherein the change request calendar scheduling operation is configured to provide a calendar style interface allowing drag and drop operations to assist in updating resource scheduling to avoid conflicts with other enterprise scheduling considerations.

20. The non-transitory computer readable medium of claim 14, wherein validation of required fields for each product offering stored within the user wish list is performed as part of copying items from the user wish list to the shopping cart.

* * * * *